Aug. 5, 1930. S. G. STUCKEY 1,772,092
PNEUMATIC GOB FEEDER
Filed April 1, 1929 6 Sheets-Sheet 1

INVENTOR:
SAMUEL G. STUCKEY

By Edward E. Longan
ATTORNEY.

Fig. 2

Aug. 5, 1930.  S. G. STUCKEY  1,772,092

PNEUMATIC GOB FEEDER

Filed April 1, 1929  6 Sheets-Sheet 4

INVENTOR:
SAMUEL G. STUCKEY.
BY Edward E Longan
ATTORNEY.

Aug. 5, 1930.　　　　S. G. STUCKEY　　　　1,772,092
PNEUMATIC GOB FEEDER
Filed April 1, 1929　　　6 Sheets-Sheet 5

INVENTOR
SAMUEL G. STUCKEY
By Edward E. Longan
ATTORNEY.

Aug. 5, 1930.          S. G. STUCKEY          1,772,092
PNEUMATIC GOB FEEDER
Filed April 1, 1929     6 Sheets-Sheet 6

INVENTOR:
SAMUEL G. STUCKEY.
By Edward E. Longan
ATTORNEY.

Patented Aug. 5, 1930

1,772,092

UNITED STATES PATENT OFFICE

SAMUEL G. STUCKEY, OF ST. LOUIS, MISSOURI

PNEUMATIC GOB FEEDER

Application filed April 1, 1929. Serial No. 351,571.

My invention relates to the art of feeding mold charges or gobs of molten glass by means of air pressure above and below atmospheric pressure and in which the weight of the mold charge is rendered substantially uniform. At all events the variation in weight of the gob feed by my device and method is automatically maintained as nearly uniform as is humanly possible.

A further object is to eliminate the various head adjustments which have been hitherto used in feeders because I have found that wherever hand adjustments were available, the operator of the machine would invariably experiment with the same to try to increase his production, because the operators on glass forming machines are paid a salary plus a bonus if they exceed a predetermined production, and that, therefore, they were constantly manipulating such adjustments in an attempt to increase the bonus paid them, but I have also found that very often such manipulation of the hand adjustments by the operator, while it did increase the output of the forming machine, resulted in the production of ware, which varied so in weight as to be absolutely useless. Of late purchasers of bottles or similar containers have insisted that the weight of such bottles or other containers be held to a very fine limit because if the weight thereof is excessive, the capacity will be less, and since laws have been made that are very strict on the point of capacity, such bottles or containers had to be rejected because they would not comply with the laws. Then, again, if the articles are below weight, they will be over in capacity, thus causing a loss to the dealer who sells the commodity contained therein. This also causes rejection of the containers or bottles These light weight bottles are also exceptionally undesirous because in the case of selling bottles filled with liquid, they are filled by automatic machinery which delivers only a certain or exact quantity of liquid to each bottle and if the capacity of the bottle is increased and the correct quantity of liquid placed therein, the customer purchasing the goods will think that he is being cheated on account of the low level of the liquid in the bottle.

A further object is to have a single or master control by means of which all the various parts of the feeder, and also the forming machine, are started on their cycle of operation in their proper sequence, and this sequence be made non adjustable so that when the master control is once set at a predetermined speed, the various other parts of the apparatus, such as the formation of the gob, the shearing mechanism, and the forming mechanism, cannot be altered as to their timed relation. This feature is essential because I have discovered by it that it is primarily the weight of the gob of glass which controls the perfection of the finished article although the shape of the gob does have some effect, because a gob of glass may vary in length as much as two inches and still produce a perfect article, providing the weight of the gob remains the same. Of course, the shape has some effect on the quality of ware turned out because if the gob is too thin, that is too small in diameter, it will have a tendency to fold upon itself after entering the blank or parison mold, consequently forming waves in the finished article. This formation of waves is highly objectionable because it has the effect of distorting the appearance of the contents of the bottle or container.

My device is so arranged that it can be used with any timing device that can be purchased on the open market, provided it does not have any adjustments other than the speed of the machine as a whole, but I have found that a water timer is more reliable than the other various types because its operation is not effected to any great extent by temperature changes, etc. One of the most common types of timer is the electric motor but this has been found to contain serious defects. For instance, a variation in steam pressure causes the voltage of the generator to vary and consequently this variation in voltage effects the speed of the motor. This in turn varies the speed of the machine as a whole against the flow of the glass causing the weight of the gob to vary. With a water timer a much finer adjustment can be had than with a variable speed motor for the reason that with a variable speed motor it is necessary to use a rheostat and on these rheostats only fixed stations are available. Consequently the speed of the motor can not be controlled as finely as a water timer.

Another important feature of my device is in the adjustment of the hollow tube in which the plus and minus pressures exert their forces on the glass within the boot or feed spout as the shape and weight of the gob is controlled to a great extent by the adjustment of the lower end of this tube to and from the outlet orifice.

I have also discovered through experiment that when hand adjustments, such as previously used to control the shape and weight, are eliminated, I can still control the weight and approximate the shape by the quickness at which the plus and minus air pressures are exerted and by the volume of air handled during the creation of these pressures. This change in weight and shape is not due alone to the volume of air handled but also bears a direct and fixed relation to the size of the outlet orifice and the temperature of the glass.

Another important feature of my device is that I can vary the quickness at which either the plus or minus pressure is exerted without varying the speed of the machine as a whole. In other words, if my device is set to make, for instance, 15 bottles a minute, it will operate at that speed regardless of the quickness at which either the plus or minus pressures are exerted and it is also obvious that the volume or air handled by the control cylinder, which I use, will not be changed when the quickness of operation of this cylinder is increased in either direction.

Another important feature of my device is that I do not have to stop the entire machine for the purpose of changing speeds. This is especially true where a variable speed motor is used as a timing device for the reason that a variable speed motor only has a certain range of speeds and if any timing beyond this range is attempted, it is necessary to change gears and sprockets because none of these motor driven timing devices operate directly from the motor but either through a worm gear, or friction drive which are driven by a chain and sprocket. My device when using the water timer, as aforementioned, can also be locked against unauthorized changing of speed thereby preventing the objectionable feature of the machine operator tampering with adjustments when once made, but this is hardly possible where a rheostat is used.

It is the custom to set a glass forming machine to operate at the highest possible speed conducive to the production of perfect ware, and it has been found that where the speed of the machine was increased so as to produce only one bottle more per minute, that the bottles when taken from the mold after being blown, were so hot that they would sag out of shape, consequently producing useless ware. This was frequently the cause where operators attempted to make record runs or make a record in production because the bottle did not have time to properly set before being removed from the mold.

An important feature of my feeder is that there is no suspension period for the completed gob or in other words at the end of the plus pressure stroke whereby it can elongate by gravity while suspended from above so as to assume a desired shape but as soon as the required weight of glass has been extruded by the plus pressure, atmospheric pressure is restored and immediately thereafter the minus pressure commences to act and simultaneously therewith the severing action takes place. This is due to the fact that the control cylinder or plus and minus pressures pump automatically and instantly reverses itself when the piston therein has reached the end of the pressure stroke and this reversal takes place about the last one thirty-second of an inch of the pressure stroke and at the time when atmospheric conditions prevail in the tube, which is submerged in the glass. In fact the only time that there is any gravity flow of glass or what may be termed an uncontrolled period of glass flow is the time that elapses between the end of the minus pressure period and the beginning of the plus pressure period. Any time of suspension after the compression stroke has been completed and before the vacuum stroke starts will cause stretching at the upper portion thus producing a charge with a long tail at the upper end of the gob, which is not desirable. The length of the gob can be controlled to a great extent by the quickness at which the minus pressure is applied because as this quickness is increased the stub remaining after the severing is lifted higher and higher above the shearing mechanism and consequently when the plus pressure is applied the severed end or stub will have to travel a greater distance before severing or shearing again takes place.

I have also discovered that in the plunger type of feeder, that is the type where a reciprocating plunger is used, that the colder the glass the higher it is lifted above the shear plane and the glass being colder would descend slower causing a light weight gob, whereas if the glass were hotter, its lift would not be so high causing excess weight. This necessitated frequent adjustments because the plunger acted only by the adhesion of the glass to it, but with my air feed the reverse takes place, the more viscous the glass, the less it will be raised above the shears on account of offering greater resistance to the minus pressure while if more fluid, it will be raised higher above the shears thereby substantially automatically regulating the distance the lower end of the gob of glass will have to travel before it reaches the desired point below the shearing plane prior to shearing as the temperature of the glass varies and thus the length of the mold charges are maintained uniform because the speed of the flowing glass varies with a variation of the temperature.

In the drawings:

Fig. 3 is an enlarged fragmental view with parts in section of the water timer made use of;

In the construction of my device I employ a base 1, which is provided with parallel upwardly extending members 3 and 4, these members having their upper ends connected by a plate 5 on which a timing device, to be described later, is supported. Projecting inwardly from the members 3 and 4 and adjacent the base 1 are ribs 6 on which the flange 7 of an air pump or control cylinder 8 rests. This air pump or control cylinder is closed at its lower end by a head 9, its upper end being entirely open.

Secured in the head 9 is a pipe 10 which communicates with the interior of the cylinder. This pipe is carried upward and has its opposite end 11 secured in a casting 12 in which casting is secured a tubular member 13. The tubular member 13 extends downward through an opening 14 formed in the top of a boot or well 15 and has its lower end submerged. This boot or well projects outwardly from the feeding end of a glass furnace and has constant and direct communication with the interior thereof. The construction of this boot and the manner of its communication with the glass furnace, being well known, will not be described in detail.

Directly below the opening 14 and in the bottom of the boot or well 15 is an opening 16 in which a master bushing 17 is located. This master bushing has a relatively large opening 18 formed therethrough so that when the auxiliary bushing 19, which forms the outlet orifice, is placed in position below this bushing an auxiliary well will be formed in the boot, the space within the boot at which the glass is located being generally termed a well.

The tubular member 13 is provided at its upper end with a passage 20 which is substantially the same diameter as the pipe 11. The lower portion of the tubular member 13 has an enlarged opening therein as indicated by the numeral 21.

The casting 12 is supported on an arm 22, which is slidably mounted on a rod 23. The arm 22 is also provided with a screw threaded lug 24 through which an adjusting screw 25 passes. This screw is rotated by any suitable means, such as bevel gears or the like, and is indicated by the numeral 26. The purpose of this adjusting screw is to control the distance of the lower end of the tube 13 relative to the master bushing. This is essential because in that way I obtain a valve action at the lower end of the tube 13. This adjustment also tends to keep the hydrostatic head or head pressure of the glass within the boot or well sufficiently great to prevent air under pressure from passing out underneath the lower end of the tube 13 and upward through the glass in the well. In other words, this head pressure must always be great enough to prevent the air from passing out along the underside of the tube into the well so that all action will be had in a vertical direction downward on the glass immediately above the outlet orifice and not be dissipated sidewise.

Figures 1, 7:
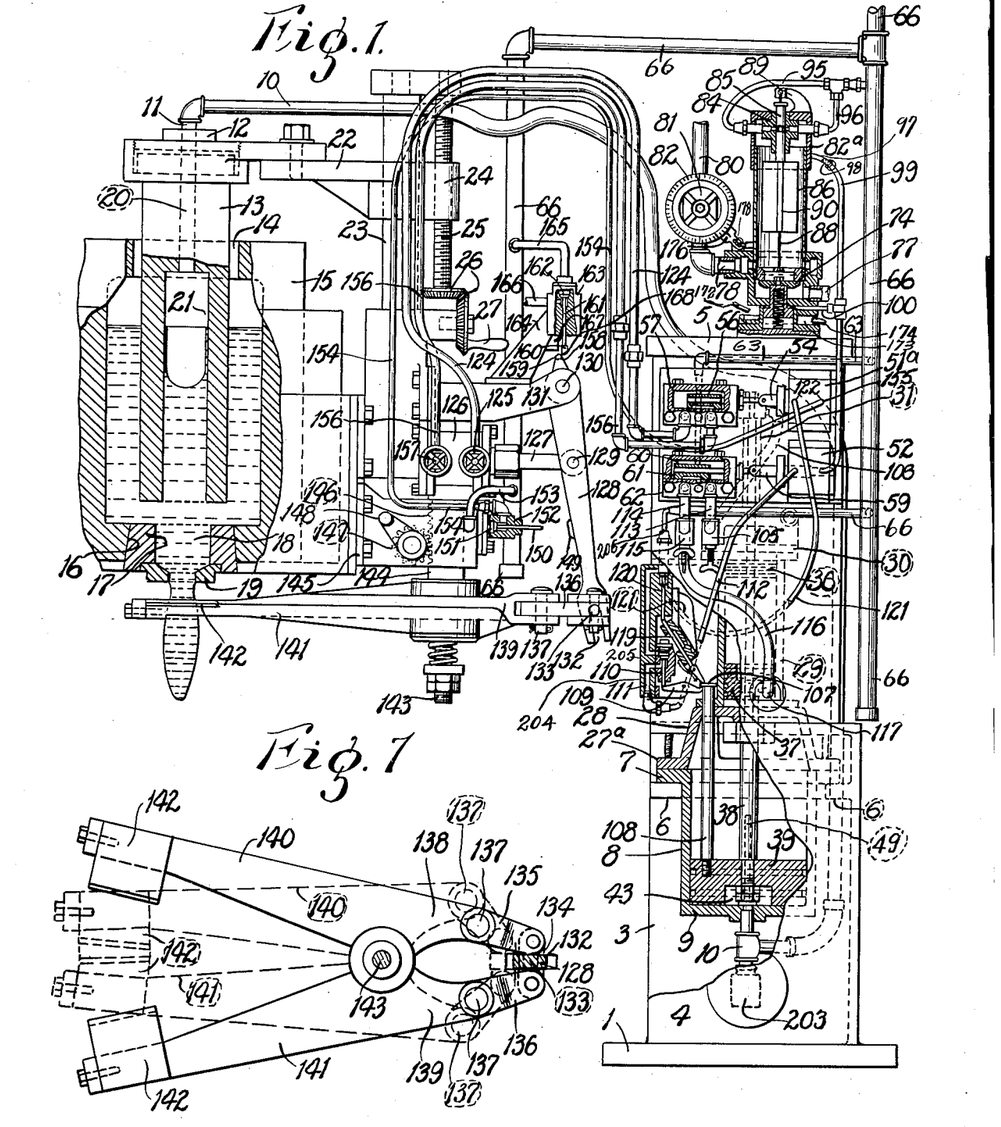
Fig. 1 is a side elevation of my device showing the same attached to a feed spout of a glass furnace with parts broken away and in section.
Fig. 7 is a top plan view of the shears.
Figure 2:
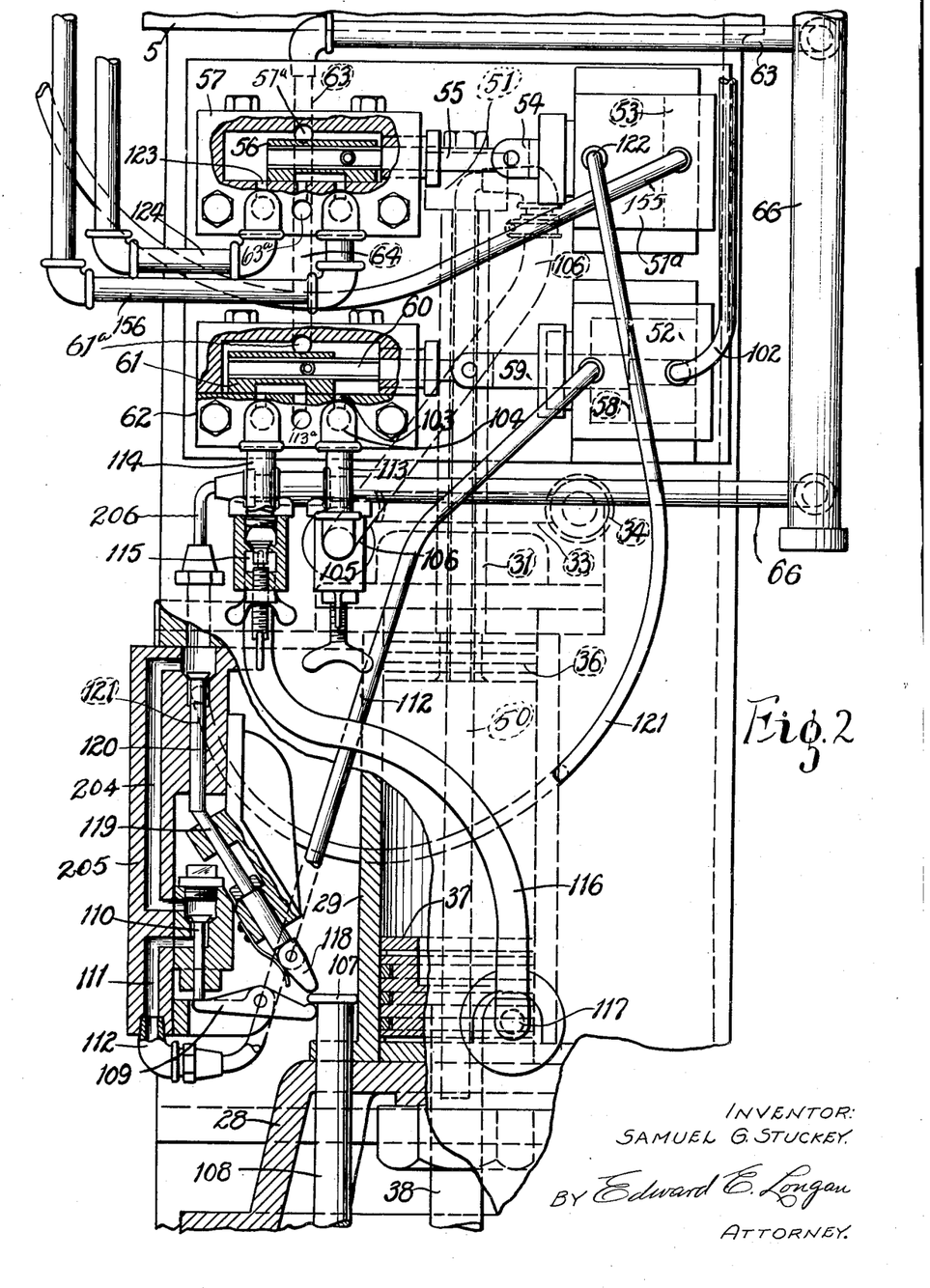
Fig. 2 is an enlarged fragmental front elevation with parts in section of a portion of my device showing various valve mechanisms and their operating parts.

Secured to the flange 7 is a flange 27ª, which carries a spider 28 and on this spider is supported an air or power cylinder 29. This air or power cylinder has its lower end or head fixed but is provided with a removable upper head 30. A hollow screw 31 passes through the head 30 of the power cylinder 29 and is provided with a key-way so that the screw will not turn. The screw also passes through a worm wheel 33, Fig. 2, which is provided with a screw threaded central bore, which is designed to be rotated by a worm 34, this worm in turn being operated by a handle 35. To the lower end of the screw 31 and within the cylinder is located a head 36, which is raised and lowered as the screw is manipulated and in this manner the length of the interior of the air or power cylinder 29 is controlled.

Mounted in the power cylinder 29 is a power piston 37 which has a downwardly projecting piston rod 38 carried thereby and to the lower end of this piston rod is a control piston 39 which is located in the air or control cylinder 8. The piston 39 has bores 40 and 41 formed therethrough as well as an opening 42 which connects the bore 40 with a counter-sunk portion 43 formed in the lower face of the piston 39. The purpose of this counter-sunk portion 43 is to permit the piston 39 to come completely down against the inner face of the head 9. The bore 40 has formed concentric therewith and on the upper face of the piston 39 a valve seat 44 on which a valve 45 seats. This valve is spring operated and has its valve stem 46 extending downward through the opening 40. The valve stem, however, is slightly lower than the width of the piston face so that its end will project below the lower end of the piston and when the piston seats against the head 9, the valve 44 will be raised from its seat. As soon as this valve is unseated, the interior of the tubular member 13 is open to atmosphere. The purpose of this will be explained in detail later.

The opening 41 has a valve seat 47 formed concentric therewith and in the lower face of the piston 39 on which seat the valve 48 is seated. This valve is also spring operated and has a valve stem 49 extending upwardly through the piston 39 and terminating at quite a distance above the piston 39. The end of the valve stem 49 is adapted to connect with the lower end of a rod 50, which is carried by a yoke or bracket 51. This yoke or bracket is secured to the upper end of the adjusting screw 31.

The rod 50 is of such length that just before the piston 37 reaches its upper limit of stroke, the valve stem 49 will contact with the rod 50 opening or unseating the valve 48 thus again opening the interior of the tube 13 to atmosphere. This is due to the fact that there is no piston head at the upper end of the air or control cylinder 8. By raising and lowering the adjustable head 36, the length of stroke of the piston 37 is controlled, and by reason of the rod 50 being carried by the end of this adjusting screw, its lower end relative to the adjustable head 36 and the extreme upward movement of the piston 39, never varies so that the valve stem 49 will always contact with the rod 50 just before the extreme limit of piston stroke is reached. It will, therefore, be seen that the interior of the tube 13 is opened to atmosphere at the end only of each of the piston strokes or reciprocations and at no other time and that there is no possibility of varying this time.

Carried by the member 3 are air cylinders 51ª and 52. The cylinder 51ª has located therein a piston 53, which is provided with a piston rod 54. This piston rod is connected to a rod 55 which in turn is secured to a spool valve 56 mounted in the valve housing 57, which in turn is mounted on the member 3. The cylinder 52 is provided with a piston 58, which is provided with a piston rod 59. This piston rod is in turn secured to a valve stem 60 to which is connected a spool valve 61, this valve being in turn mounted in a valve housing 62, which is also carried by the member 3.

Connected to a port 57ª in the valve housing 57 is an air pipe 63, which has an extension 64 leading to the valve housing 62. The pipe 63 is connected to a supply pipe 66, which leads from any suitable source of air supply either directly from a compressor or from a storage tank, the storage tank being preferable because a more uniform pressure can be maintained therein.

Figure 3:
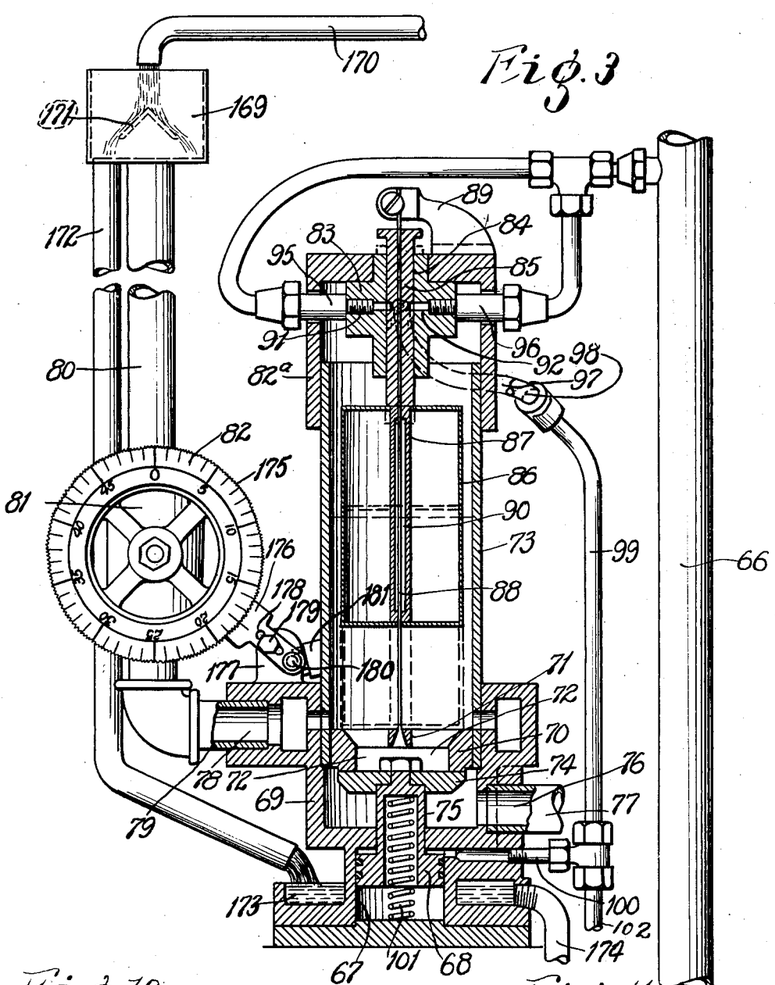
Figure 4:
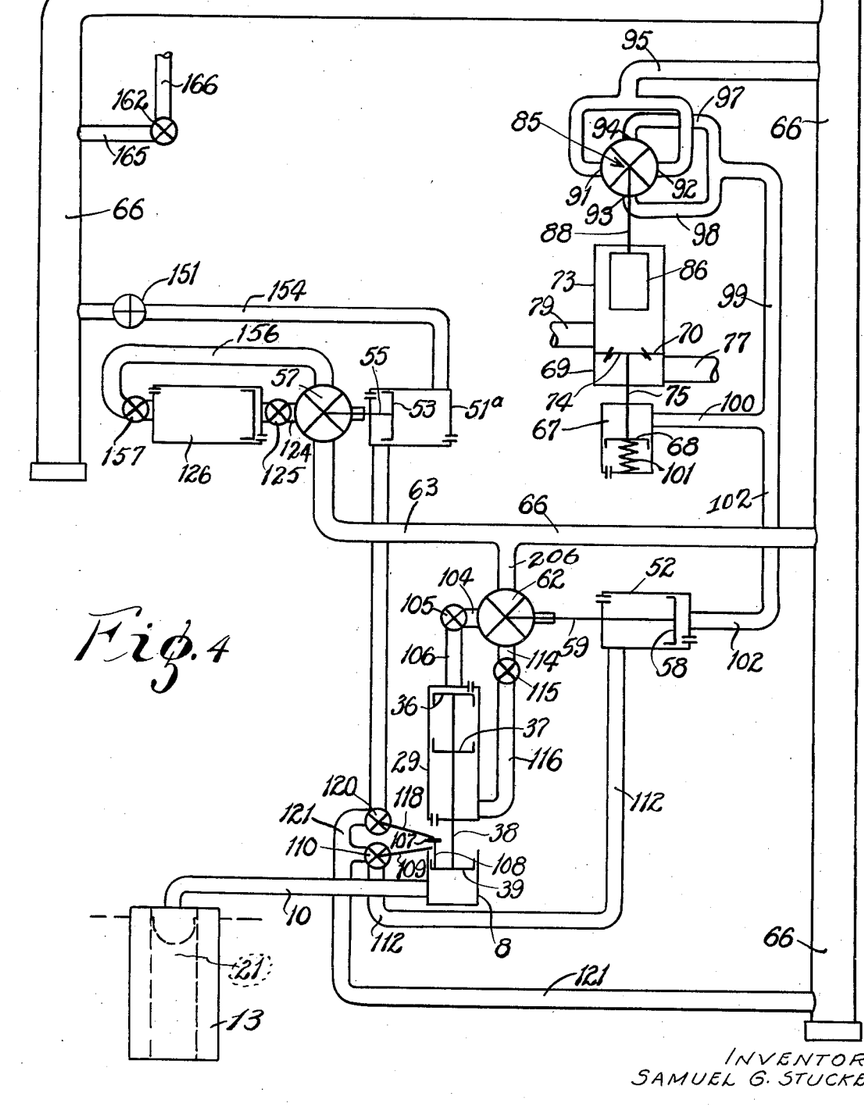
Fig. 4 is a diagrammatic view of the piping system used in connection with the water timer.

Mounted on the plate 5 is a short air cylinder 67, Fig. 3, in which a spring actuated piston 68 is located and supported by this cylinder is a casting 69. Within the casting 69 is located a spider 70, which has a central boss 71 and openings 72. This spider 70 constitutes the bottom of the water timing container or cylinder 73, the openings 72 being normally closed by means of a valve 74 carried by the extension 75 of the piston 68. The casting 69 is provided with an outlet opening 76 in which a pipe 77 leading to any suitable source of drainage is secured. The casting 69 is also provided with an inlet port 78, which is located above the spider 70 and to which a pipe 79 is secured. The pipe 79 has connected therewith a stand pipe 80, which pipe is so arranged as to hold a predetermined head of water and which stand pipe is provided with a valve 81, this valve being controlled by a hand wheel 82 by means of which the flow of water to the cylinder 73 can be accurately determined.

Mounted on the cylinder 73 is a casting 82ª in which is secured a member 83 having four passages therein as will be explained in detail later. The casting 83 is also provided with a central bore 84 in which a pilot valve 85 is slidably mounted.

Located within the cylinder 73 is a float 86 which is designed to be raised as water enters the cylinder 73 and in order to prevent this float from moving sidewise, it is provided with a central guide 87 through which a guide wire 88 extends, this guide wire being secured in the boss 71 of the spider 70 at its lower end and secured to the bracket 89 carried by the casting 82ᵃ at its upper end. This guide wire also extends through the valve 85. The guide 87, however, has its major portion between the ends cut away as indicated by the numeral 90 so as to reduce friction but still permit only vertical movement of the float.

The casting 83 has formed therein ports 91, 92, 93 and 94, the ports 91 and 92 being connected to pipes 95 and 96, which are directly connected to the supply pipe 66 while the ports 93 and 94 are connected to pipes 97 and 98. The purpose of having four ports is to prevent the valve 85 from being forced over to one side of the casting 83 and thus retard its movement. In other words, by having two inlet ports and air on opposite sides of this valve and two outlet ports on opposite sides of the valve, the air pressure is equalized and all binding of the valve, due to air pressure, is eliminated, leaving it free to move up and down without any undue binding.

The pipes 97 and 98 are connected to a pipe 99, which pipe is connected by a short pipe 100 to the cylinder 67 so that air passing therethrough will pass to the upper side of the piston 68 depressing it against the spring 101 thus opening the water cylinder 73 and permitting water to flow out through the pipe 77.

The pipe 99 has its lower end 102 terminating at one end of the air cylinder 52. In this way when air passes down the pipe 99 it will simultaneously enter the cylinder 67 and release any water in the cylinder 73 and also operate the piston 58 in such a manner as to push the spool valve 61 into the position so as to permit air to pass from the pipe 64 through the port 103 into the pipe 104, thence through the throttling check valve 105 into the pipe 106, which pipe leads into the hollow adjusting screw 31, thence down through the head 36 driving the piston 57 downward and compressing air in the cylinder 8 and driving this compressed air into the tube 13.

The compressing of the air in the control cylinder 8 is accomplished by reason of the piston rod 38 being connected to the control piston 39 so that the pistons 37 and 39 have simultaneous movement and since the distance between these pistons is fixed so that they both will move the same distance. When the piston control 39 almost reaches the lower end of the cylinder 8 or the head 9, the end of the valve stem 46 contacts with the head raising the valve 45 from the seat 44. This permits the compressed air in the pipe 10 and in the tubular member 13 to rush out and restore atmospheric conditions in the tubular member. At this time the head 107 of the rod 108, which is carried by the piston control 39, contacts with one end of the rocker arm 109 unseating the valve 110 permitting air to pass through the passage 111 into the pipe 112. This air passes upward into the cylinder 52 driving the piston 58 toward the right and moving the spool valve 61 so that air will exhaust from the upper end of the power piston 37 through the pipes 106 and 113 and escape through the vent or port 113ᵃ. This action also admits air into the pipe 114, which is connected to the valve housing 62. From there the air passes through the throttling check valve 115 and then through the pipe 116, through the port 117, and to the lower side of the power piston 37 commencing to drive it upward and create a suction at the lower end of the cylinder 8 thereby immediately reversing the action of the control piston.

So, therefore, it will be seen that there is no dwell period of the piston control 39 between the vacuum and compression and vacuum strokes but this reversal is almost instantaneous.

As the piston 39 commences to ascend the head 107 of the rod 108 strikes the pawl 118 pushing up on the rod 119. This rod unseats the valve 120 which permits air to pass into the line 121, this line leading to the port 122 formed in the cylinder 51ᵃ driving the piston 53 therein to the right. This operates the spool valve 56 and permits air to pass through the port 123 into the pipe 124. This pipe extends over and passes through a valve 125 after which it passes into a port entering the shear-operating cylinder 126 at the right side.

As soon as the air enters the cylinder 126 it contacts with the piston therein and draws the piston rod 127 inward. This piston rod is connected to the arm 128 at the point indicated by the numeral 129. This arm is pivotally connected at its upper end as indicated by the numeral 130 to a bracket 131. The lower end of the arm is bifurcated as indicated by the numeral 132. This bifurcation passes over a pin 133 which pin is carried by a member 134. Pivotally secured to the ends of this member are links 135 and 136. These links are in turn pivotally connected at their opposite ends as indicated by the numeral 137 to the short arms 138 and 139 of the shear. The long arms 140 and 141 carry the shear blades 142. The arms 140 and 141 are pivotally carried by a stud 143, which stud is carried by a sliding member 144. This member is carried by a bracket 145, which is secured at any convenient point adjacent the feed spout or boot. The sliding member 144 is provided with rack teeth 146 which mesh with a pinion 147. This pinion is adapted to be rotated by means of a crank handle 148 and by this means the shears can be bodily adjusted to and from the outlet orifice.

The arm or lever 128 is provided with a boss 149 which is adapted to contact with the valve stem 150 of the valve 151. This valve is mounted in the valve housing 152 and receives air from the main supply pipe 66 through the pipe 153. As soon as this valve is opened, air will enter the pipe 154 and from there pass to the air cylinder 51ᵃ entering it at the right at the point indicated by the numeral 155 driving the valve 56 to the right and permitting air to enter the pipe 156. This air passes through the pipe 156, then through the valve 157, and into the shear cylinder 126 at the left, forcing the piston to the right.

The upper end of the arm 128 is provided with a projection 158 which carries a roller 159. This roller is adapted to contact with the pivoted dog 160 carried by the valve stem 161 for the purpose of operating the valve 162. Ths valve is located in the valve housing 163 which is carried by the bracket 164. The valve housing 163 receives air through the pipe 165 from the main supply pipe 66. A pipe 166 leads from this valve housing to the forming machine, not shown, and places it in rotation. The bracket 164 also has a projection 167 against which the pivoted dog 160 rests. In this way when the shears are closed, a dog 160 can swing out freely so that the valve 162 will not be operated but on the opening of the shears and just at about the time they are fully opened, the roller 159 contacts with the inclined surface 168 of the dog 160 and raises the valve.

It will, therefore, be seen from the foregoing that all of the various movements of the device are automatically controlled and in fixed timed relation to each other and there is no way possible in which this timed relation can be varied.

The rod 108 in addition to operating the valves 110 and 120 also prevents the piston 39 from turning in the cylinder 8 thereby keeping the valve stem 49 and the rod 50 in alignment thus preventing any possibility of these two members missing contact and assuring the opening of the valve 48 at the end of the pressure stroke.

Secured to the upper end of the stand pipe 80 is a receptacle 169 which is designed to receive water or other fluid constantly from the pipe 170, this pipe leading to any suitable source of supply, such as a pump, and in order to prevent this fluid from dropping directly into the stand pipe 80 and creating a false pressure therein, a deflector 171 is employed.

The receptacle 169 is also provided with a drain pipe 172, which is secured in its bottom and is of equal or larger capacity than the supply pipe 170 so that there will be no danger of surplus liquid accumulating in the receptacle 169. The lower end of this pipe is open and discharges into a receptacle 173 which surrounds the lower end of the water timer but is spaced a suitable distance thereabove so that the operator can at all times see whether the stand pipe is full. This is ascertained, of course, by the liquid flowing from the pipe 172 into the receptacle 173 and should this flow at any time cease, the machine operator will know at once that his device is not functioning properly and something is wrong with the water timer. The liquid discharged into the receptacle 173 is drained off through the pipe 174 to the same source as that to which the pipe 77 leads. This source is preferably a tank from which the liquid is repumped back through the pipe 170.

Figures 5, 6, 8, 9:
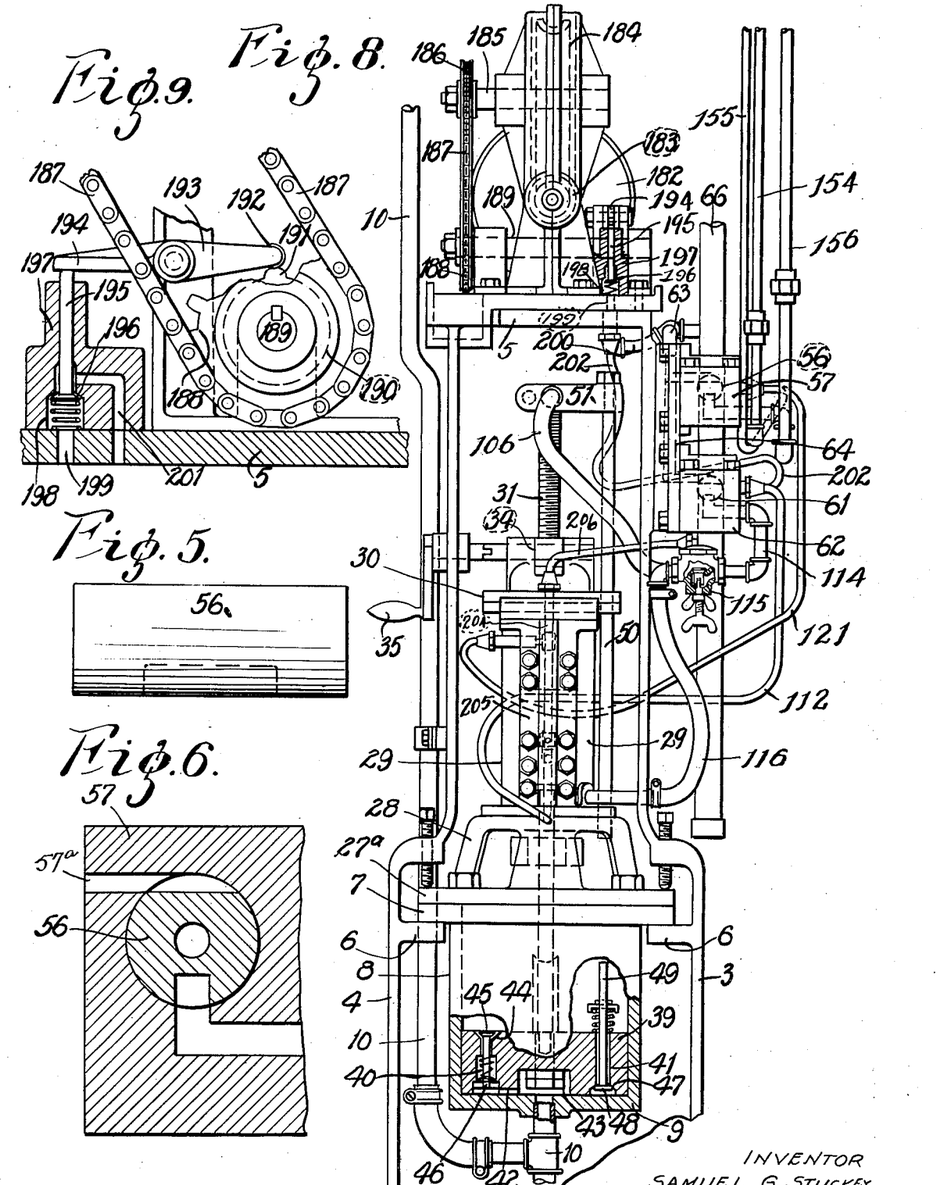
Fig. 5 is an enlarged view of one of the slide valves.
Fig. 6 is an enlarged vertical cross section of one of the slide valves and its housing.
Fig. 8 is an enlarged fragmental side elevation of my device showing a different type of timer for operating the control valve.
Fig. 9 is an enlarged fragmental side elevation with parts broken away in section showing the manner in which the motor driven timer operates the control valve.
Figure 10:
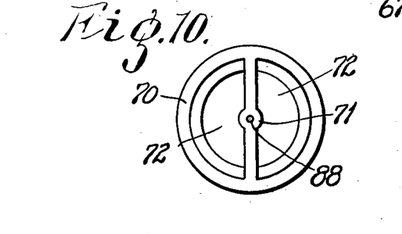
Fig. 10 is a top plan view of the spider showing the water passages therethrough.
Figure 11:
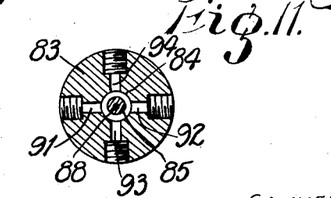
Fig. 11 is an enlarged cross section taken through the member 83, the passage formed therein, and the valve 85.
Figure 12:
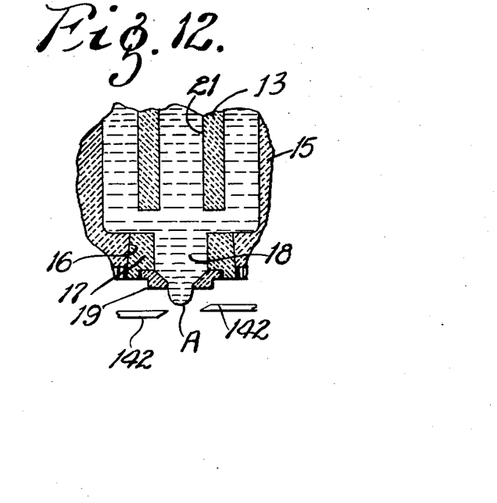
Fig. 12 is a diagrammatic view showing the height of the lift of the severed stub of glass when the glass is relatively cold.
Figure 13:
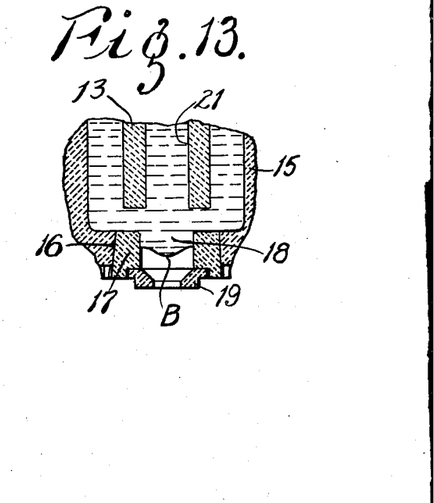
Fig. 13 is a similar view showing the height of the lift of the severed stub of glass when the glass is hot.
Figure 14:
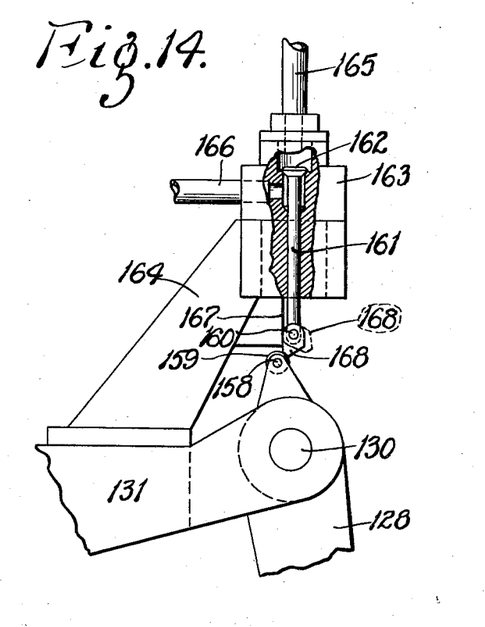
Fig. 14 is an enlarged view with parts in section of the pilot valve which starts the forming machine.

The hand wheel 82 preferably has its edge serrated as indicated by the numeral 175. These serrations are adapted to engage with similar sized serrations formed on the locking member 176. This locking member is carried by a bracket 177 and has formed therein a slot 178 through which a bolt 179 passes. The lower end of the locking member 178 is provided with an opening through which a bolt 180 passes. This bolt is provided with a head on one end and at the other end with an opening through which the hasp of a padlock or similar fastening device 181 can be passed and when this fastening device is in position, no turning of the hand wheel 82 is possible. The purpose of this is that when the hand wheel is set so as to operate the water timer to produce a certain number of bottles per minute, the operator cannot at any time make an unauthorized change, it being necessary to call either the superintendent or what is commonly known in a glass factory as "the trouble shooter" to make such adjustment. This is accomplished by removing the locking device and then removing the bolt 180 thus permitting the locking member 176 to be moved downward while the wheel 82 is being turned so as to adjust the valve for a different speed of production. Then after this change has been made, the locking member is again brought into engagement with the periphery of the wheel so that the serrations thereon will engage with the serrations 175, then the bolt 180 inserted, and this bolt locked against removal by means of the lock 181. Thereafter no adjustment of the valve can be made except by the person having charge of the device, who alone can open the lock and permit the removal of the bolt 180. This, as before stated, pervents the machine operator from increasing or even attempting to increase the production of his machine so as to get a bonus but he will have to depend entirely on turning out a perfect ware to get this bonus.

Where the water timer is not available, I have shown a modified construction in which a motor 182 is employed. This motor has mounted on its shaft a worm 183 which meshes with a worm wheel 184. The worm wheel is mounted on a shaft 185 on which a sprocket wheel 186 is secured. Passing around this sprocket wheel 186 is a chain 187, which also passes around a sprocket 188, which sprocket in turn is mounted on a shaft 189. Mounted on the shaft 189 is a disk 190 which has a projecting tooth 191. The disk 190 is firmly keyed on the shaft 189 and cannot be angularly changed thereon. This is important especially with this kind of timer, because I do not desire to have the angular position changed but even if it were changed accidentally this would not affect the timed relation between the various parts.

The projection 191 is designed to contact with the end 192 of a rocker arm 193. The opposite end 194 of the rocker arm contacts with the valve stem 195 of a valve 196, which is mounted in the valve housing 197. This valve housing is provided at its lower end 198 which communicates with an opening 199 formed in the plate 5. Communicating with this opening is a pipe 200, which communicates with the air supply pipe 66. The valve housing has also formed therein an opening 201 to which is connected a pipe 202, this pipe leading to the air cylinder 52 and takes the place of the pipe 102. When this structure, just above described, is used, it is understood, of course, that the water timer together with all of its piping connections, including the pipes 99 and 102, are dispensed with and the piping structure just described leading from the main supply pipe 66 and from the valve housing 197 to the cylinder 52 are substituted in lieu thereof.

I have however discovered, as aforementioned, that a timer of this type is not nearly as flexible as the water timer because its range is not so great without making mechanical changes for the reason that a rheostat must be used to control the speed of the motor and as the movement of the rheostat or rather its capacity to vary the power supplied to the motor is limited, the speed of the motor is limited within certain ranges. This necessitates changing of the sprockets 186 and 188 to obtain intermediate speeds, which cannot be controlled through the motor and rheostat. However such changes necessitate the shutting down of the machine. Then again it is well known that the speed of the motor will vary as the voltage of power delivered to the motor varies and this voltage varies as the speed of the generator varies. Most glass plants furnish their own electric power from generators which are driven by steam engines. Consequently as the boiler pressure varies, the speed of these engines vary thus causing fluctuations in the voltage delivered by the generator and consequently fluctuations in the speed of the motor. This is practically uncontrollable and enters directly into the production of perfect ware since it affects the operation of the entire mechanism. Then again the motors, being located very close to the furnace, have a tendency to become overheated, which also affects their efficiency and since a rheostat must be used, it is impossible to lock this rheostat because should anything go wrong with the motor it must be shut off and the rheostat must also be shut off before again starting the motor thus the machine operator must handle the rheostat. In fact there are very many little details in the last mentioned drive which render it undesirable for use in glass factories but I wish it to be distinctly understood that these objections do not render the device useless because arrangements might be made which would prevent a great many, if not all, of these objections.

To the pipe 10 is removably attached a receptacle 203, which acts as a trap to catch any moisture or oil which may enter the pipe and prevent it from being carried over into the tubular member 13.

Air is supplied to the valves 110 and 120 through a passageway 204, which is formed in the plate or casting 205, which forms a part of the housing for said valves, an air conduit 206 terminates at one end in this passageway, its other end being connected to the air supply pipe 66 so as to assure a constant supply of air under pressure to these valves at all times.

The operation of my device is as follows: After the glass has been properly prepared in the melting tank so as to flow into the boot or feed spout 15 and create the proper head of glass therein, the device is ready to be set for operation.

The first step is to close off the valve 81 and fill the stand pipe 80 through the pipe 170 so that the fluid will commence to overflow through the pipe 172 and be discharged through the pipe 174. The locking member 176 is then released from the teeth or serrations 175 formed in the hand wheel 82 and the wheel then turned so as to adjust the valve 81 and set the device to produce a predetermined number of bottles per minute, in the present instance as shown it being set for 18 bottles per minute. The air pressure, of course, has been previously turned on.

As fluid enters the cylinder 73, the float 86 commences to rise until its upper end comes in contact with the lower end of the valve 85. Continued upward movement of the float raises the valve so that the ports, to which the pipes 95 and 96 are connected, can communicate with the ports to which the pipes 97 and 98 are connected. This permits air to pass down through the pipe 99. The air then passes through the pipe 100 into the air cylinder 67 forcing the piston 68 downward and unseating the valve 74 thus permitting the water or fluid to escape through the openings 72 in the spider 70 and since this fluid escapes through the pipe 97 faster than can enter the cylinder, the float 86 will descend permitting the valve 85 to drop and close off communication with the air line. When the valve 85 is closed the spring 101 immediately closes the valve 74 after which the cylinder 73 starts refilling with fluid. This refilling takes place while the balance of the mechanism completes its operation.

Simultaneously with the downward movement of the piston 68 air also passes into the pipe 102 entering the air cylinder 52 and moving the piston contained in this cylinder to the left thus uncovering the port 103 and admitting air into the pipe 104. The air then passes through the throttling check valve 105 into the pipe 106 and from there into the hollow adjusting screw 31 from whence it enters the air cylinder power 29 driving the piston power 37 downward. This air pressure is continued until the power piston 37 reaches its lowest position and during this downward movement air is compressed by the control piston 39 in the lower end of the cylinder 8, this piston being connected to the power piston 37 by the piston rod 38. The air thus compressed all passes through the pipe 11 into the tubular member 13, there being no relief valves, causing glass therein to be pushed downward toward the outlet orifice thereby assisting the gravity flow of glass through the outlet orifice. During the last fractional portion of the downward movement of the piston 39, the end of the valve stem 46 strikes the head 9 of the cylinder 8 unseating the valve 45 and permitting the air, which is under compression in the hollow portion 21 of the tubular member 13, to rush out backward through the pipe 10 and the passage 42 thus restoring atmospheric conditions within the tubular member 13. At this time the head 107 of the rod 108, which is carried by the piston 39, contacts with the rocker arm 109, opening the valve 110. This valve receives its air supply from a pipe connection made to the air pipe 66. When this valve is unseated, air is admitted to the pipe 112, which enters the cylinder 52 at the left hand side, driving the piston 58 to the right. This moves the spool valve 61 to the right and permits air from the pipe 66 to enter the pipe 114. This air then passes through the throttling check valve 115 into the pipe 116, thence into the port 117 at the lower end of the cylinder 29 driving the power piston 37 upward.

As this piston moves upward the control piston 39 also moves upward causing the head 107 of the rod 108 to release the rocker arm 109 and close the valve 110. As soon as this valve has been closed, the head 107 contacts with the pawl 118 thus pushing upward on the rod 119. This in turn opens the valve 120 and permits air to enter the pipe 121, which air travels to the cylinder 51 and enters the port 122 driving the piston in the air cylinder 51 to the right and moving the spool valve 56 to the right. This permits air from the main supply 66 to enter the port 123 and from there pass into the pipe 124. This air passing through the valve 125 into the right hand end of the shear cylinder 126 moves the piston therein to the left thus causing the arm 128 to which it is connected to swing in toward the cylinder 126 around its pivot 130. This closes the shears and cuts off the extruded gob of glass which is then permitted to drop into the parison molds of a glass forming machine.

But at the time that the shears are fully closed, the projection or boss 149 on the arm 128 contacts with the valve stem 150 opening the valve 151 which is located in the valve housing 152. Air is supplied to this valve housing through the pipe 153, which is also connected to the main air pipe 66. The air thus admitted passes through the pipe 154 into the port 155 of the air cylinder 51 driving the piston in this cylinder toward the left and moving the valve 56 in the same direction. This closes the port 123 and permits the air therein to escape but open the port, to which the pipe 156 is connected, to the air supply. This pipe 156 leads to the valve 157 located at the left end of the shear cylinder 126 and drives the piston therein toward the right opening the shears.

At this time the roller 159 carried by the projection 158 on the upper end or lever of the arm 128 contacts with the pivoted dog 160 and on account of it riding along the inclined edge 168 of this dog, the valve stem 61 is pushed upward raising the valve 162 thus permitting air in the valve housing 163 to enter the pipe 166. This pipe leads to the cylinder which operates and controls the movement of the forming machine and places it in operation. The valve housing 162 is supplied with air by means of the pipe 165, which is also connected to the pipe 66. This completes the cycle of operation of the machine.

After these two regulations have been made, the throttling check valves 105 and 115 are adjusted so as to regulate the speed or quickness of the power piston 37 in either direction, and consequently the speed or quickness of the control piston 39 in either direction independently of each other. In other words by this adjustment I can have a quick compression or plus pressure stroke and a slow minus pressure or vacuum stroke or vice versa. The throttling check valves can also be adjusted to give an equal speed or quickness of these pistons in both directions but it is to be distinctly understood that no matter what adjustment is made on these throttling check valves, the ultimate volume of air introduced into the tubular member 13 on the plus pressure and that withdrawn on the minus pressure strokes is not varied in the slightest degree because the cubical displacement of the piston 39 in the cylinder 8 is not varied by this quickness and consequently since this is not varied, there can be no variation in the volume of air introduced or withdrawn because after the valves in the control piston 39 once seat, no escape of air is possible from the tube 13.

It is also my intention to remove the handle 35 after the proper length of stroke has been adjusted so that the operator cannot, in an attempt to increase production, vary the length of the stroke of the pump because any variation therein would mean a difference in the weight of gob produced. Also by reason of the locking of the hand wheel 82, the machine cannot be speeded up as a whole by the operator so, therefore, the only way in which the operator can increase his production is to pay close attention to the temperature of the glass, and I have found that by forcing the operators to pay close attention to the temperature of the glass in the forehearth, well or boot, much better results are obtained because then they only have to watch the usual fires therein and regulate them, and thus I obtain a much better control over the viscosity or temperature of glass than is now the case where the operators have a chance to play around with various adjustments other than the fires in the boot in an endeavor to correct their negligence in not taking proper care of the temperatures.

It will, therefore, be seen that the only adjustments which the operator can make after the device has once been started, is to raise and lower the tube 13 by means of its adjusting screw or to alter the quickness at which the reciprocations of the control piston 39 occur in either direction. However the elapsed time between these reciprocations can not be altered, that is the time elapsing between the commencement of the down stroke of the control piston until the commencement of its next down stroke cannot be varied because the sooner the piston 39 gets to its lowest point, the sooner it will be reversed and again rise to its uppermost point, the only possible variation in time being from the time it arrives at its uppermost point until it again starts to descend because the reversing is automatically taken care of and occurs almost instantly with the arrival of the piston control 39 at its lowest point.

Therefore, it will be seen from my construction that there cannot possibly be any dwell at this point of reversal because the reverse is automatic when the piston is down or the end of the plus pressure stroke has been reached. Therefore, by this construction there cannot be any undesirable elongation of formation of the gob, after it has been formed, by gravity while suspended from above with the consequent tailing of the upper end of the gob because as soon as the gob has been fully extruded by the plus pressure, the minus pressure commences, which necks in the gob and after the severing or shearing operation draws it back up into or toward the boot or forehearth.

Another point which cannot be stressed too much in my application is that by reason of using air, a much more flexible and positive control of the issuing glass is obtained because the more viscous or colder the glass becomes, the less height it is raised above the shears after it has been severed, and the more fluid or hotter the higher it is raised, which is directly opposite to what occurs when the reciprocating or sticky plunger type of gob feeder is used.

Another feature is that the only uncontrolled period of gob production is at the commencement of the gob formation, that is at the completion of the vacuum or minus stroke, when the glass again commences to flow through the outlet orifice by gravity but no control over the issuing glass is lost after the plus pressure stroke once commences until after the completion of the vacuum or minor pressure stroke, and it is by this positive control over the issuing glass that I am enabled to keep the weight of the gob and its length within very fine limits of variation.

It is also important to note that as the tube is raised or lowered, the volumetric capacity of the tube above the glass therein is increased or decreased. This is due to the fact that the glass level in the boot and tube are on the same plane when atmospheric conditions prevail in the tube. This is very important especially when making small ware, such as ½ ounce bottles because these are made at the rate of between thirty-five and forty per minute and require only a small amount of glass and that must be very hot, so it is necessary that only small volumes of air be handled on the pressure and vacuum strokes. The cycle of the various operations must be rapid and such rapidity can only be obtained by shortening the stroke of the control piston, which will naturally change the volume of air handled, and if the volumetric air capacity of the tube is not reduced to meet these conditions, there would be no appreciable action had on the glass in the tube and consequently no gobs could be formed but only a continuous gravity flow varying slightly in its rapidity would be possible.

It is to be especially noted that the timed relation between the various trip valves, that is the valve which reverses the control piston, the valves which operate the severing means, and the valve which starts the forming machine, cannot be changed because these valves are nonadjustable, and the parts which operate them are also nonadjustable so that the timed relation of the operation of these valves cannot be varied relative to each other.

It is to be particularly noted that when the water timer is used the stand pipe 80 is first filled with water from a constant source of supply. The valve 81 is then opened and set so as to admit water from the stand pipe to the container 73 at a predetermined rate of flow. The conduits or pipes 95 and 96 are connected to the main air supply pipe 66 and also to the valve housing or casting 83 in which the valve 85 is mounted. It will be noted that this valve has a reduced portion intermediate its ends and which reduced portion is normally out of alignment with the ports in the casting 83 to which the conduits 95 and 96 are attached.

The casing or valve housing 83 also has conduits 97 and 98 attached thereto, which in turn lead to the conduit 99, the conduit 99 having the conduit 100 attached thereto, which leads to the air cylinder 67.

As the fluid flows into the container 73, the float 86 rises until it comes in contact with the lower end of the pilot valve 85, raising it and bringing the reduced portion in alignment with the ports to which the conduits 95, 96, 97 and 98 are attached thus permitting air to pass from the main supply pipe through the conduits 95 and 96 and into the conduits 97 and 98, and thence into the conduit 99. As soon as the air passes into this conduit 99 a certain amount thereof will pass through the conduit 100 into the air cylinder 67 depressing the piston 68 and opening the valve 74 permitting the fluid in the container 73 to rush out through the conduit 77 thus permitting the float 86 to descend and the pilot valve 85 to close.

It is to be understood, of course, that when the valve 74 in the bottom of the container 73 is opened the water will rush out faster than it enters from the stand pipe 80 thereby permitting the float to descend.

By regulating the valve 81 the length of time which it takes the float 86 to rise from its lowest position to its uppermost position, that is to open the pilot valve 85, can be accurately regulated so that it can occur any predetermined number of times per minute. The pilot valve on being opened permits the air to enter the air cylinder 52 thus starting the entire glass forming machine in operation. This starting function of the operation of the entire machine is the only function of the pilot valve and the number of times in which it operates per minute is predetermined by the size of ware to be manufactured because the smaller the ware the faster the machine can be operated as a whole.

Having fully described my invention, what I claim is:—

1. A pneumatic gob feeder comprising a control cylinder closed at one end, a control piston located therein, a power cylinder, a power piston in said cylinder, a connection between said pistons for moving the same simultaneously, a periodically operated pilot valve, means for supplying air to said pilot valve, means operated by the pilot valve for supplying air to said power cylinder for moving the piston therein in one direction, means for automatically reversing the means operated by the pilot valve for supplying air to said power cylinder so as to reverse the movement of the piston therein as soon as the same has reached the end of its initial movement, and means for periodically operating said pilot valve while the power piston is stationary in the power cylinder.

2. A pneumatic gob feeder comprising a control cylinder having a control piston therein and adapted to produce alternate plus and minus pressures at one end of said control cylinder, a power cylinder having a power piston therein for operating said control piston, a periodically operated pilot valve for controlling the admission of air to said power cylinder so that it will operate the same so as to cause a plus pressure to be created in the control cylinder, means for returning said pilot valve to its starting position, a valve automatically operated by the piston in the control cylinder as soon as it has reached the end of its pressure stroke for reversing the movement of the power piston and control piston so as to create a minus pressure in the control cylinder, and means for periodically operating said pilot valve while the power piston is stationary in the power cylinder.

3. A pneumatic gob feeder comprising a control cylinder, a control piston located therein, valves carried by said piston, a piston rod secured at one end to said piston, a power piston secured to the opposite end of said piston rod, a power cylinder surrounding said power piston, a periodically operated pilot valve, a control means periodically operated by said pilot valve for admitting air to said power cylinder for simultaneously moving said pistons in one direction so as to create air pressure in the control cylinder, separate means for automatically operating said control means for admitting air to the opposite end of the power cylinder as soon as the first mentioned movement of the piston has been completed so as to create a vacuum in the control cylinder, and means for periodically operating said pilot valve while the power piston is stationary in the power cylinder.

4. In a device of the class described, a well having a predetermined head of molten glass therein, a submerged discharge port formed in said well, a tubular member extending into said glass and located above and in alignment with said port, means for introducing a predetermined volume of air into the upper end of said tubular member, means for withdrawing a volume of air from said tubular member equal to that introduced, means for opening said tube to atmosphere at the end of the introduction and withdrawal, means for regulating the speed at which the volume of air is introduced and withdrawn, means for regulating the volume of air withdrawn and introduced without necessitating change in the quickness of introduction and withdrawal of the air, these adjustments being independent one of the other and of the speed of operation of the device as a whole, and means for automatically reversing the movement of the air introducing means immediately after the air introduced into the tubular member has been released so as to create a vacuum in said chamber.

5. In a pneumatic gob feeder comprising the combination of a tubular member with an open end adapted to be immersed in a body of molten glass above a discharge opening, an air conduit leading from the upper portion of the said tube, a cylinder with which the conduit connects, a control piston movable in the said cylinder, means for reciprocating the piston to cause alternate conditions of pressure and vaccum in the tubular member above the molten glass therein, control means for varying the quickness of movement of the control piston to produce pressure conditions, other control means to vary the quickness of movement of the piston to produce vacuum conditions, such control means being operable independently of each other and of the speed of the apparatus as a whole, and means for automatically and immediately releasing the pressure created and reversing the movement of the control piston at the extreme end of its pressure stroke.

6. In a device of the class described a well having a predetermined head of molten glass therein, a submerged discharge port formed in said well, a tubular member extending into said glass and located above and in alignment with said port, means for introducing a predetermined volume of air into the upper end of said tubular member and for withdrawing a volume of air from said tubular member equal to that introduced comprising a control piston, means for regulating the quickness of the movements of the control piston independent of the speed of the operation of the device as a whole and without changing the volume of air delivered at each stroke of the control piston, a conduit between the control means and the said tubular member that is free and unvalved, means for momentarily opening said air introducing means to atmosphere at the end of the introduction and withdrawal, and means for automatically reversing the control piston immediately after atmospheric conditions have been restored in said tube at the end of the introduction of the predetermined volume of air.

7. A pneumatic gob feeder comprising a well containing a predetermined head of molten glass and having a submerged discharge outlet, a tube open at its lower end extending into said glass and in alignment with said outlet orifice, a control cylinder, an unvalved conduit for connecting said tube and control cylinder, a control piston located in said control cylinder for alternately creating pressure and vacuum conditions therein and in said tube, a power cylinder and piston for operating said control piston, a pilot valve adapted to periodically place said power piston in operation on the compression stroke, and separate means to release said compression and to automatically reverse the movement of the power piston as soon as the compression stroke is completed.

8. A pneumatic gob feeder comprising a well containing a predetermined head of molten glass and having a submerged discharge outlet, a tube open at its lower end extending into said glass and in alignment with said outlet orifice, a control cylinder, an unvalved conduit for connecting said tube and control cylinder, a control piston located in said control cylinder for alternately creating pressure and vacuum conditions therein and in said tube, a power cylinder and piston for operating said control piston, a pilot valve adapted to periodically place said power piston in operation on the compression stroke, means operated by the piston in the control cylinder to automatically reverse the movement of the power piston as soon as the compression stroke is completed, and means carried by the control piston for automatically restoring atmospheric conditions in said control cylinder and tube at the extreme end of each stroke.

9. A pneumatic gob feeder comprising a well containing a predetermined head of molten glass and having a submerged discharge outlet, a tube open at its lower end extending into said glass and in alignment with said outlet orifice, a control cylinder, an unvalved conduit for connecting said tube and control cylinder, a control piston located in said control cylinder for alternately creating pressure and vacuum conditions therein and in said tube, a power cylinder and piston for operating said control piston, a pilot valve adapted to periodically place said power piston in operation on the compression stroke, means to automatically reverse the movement of the power piston immediately after the compression stroke has been completed, and automatically operated valves carried by said control piston for restoring atmospheric conditions in said control cylinder at the extreme end of the pressure and vacuum conditions.

10. A pneumatic gob feeder comprising a well containing a predetermined head of molten glass and having a submerged discharge outlet, a tube open at its lower end extending into said glass and in alignment with said outlet orifice, a control cylinder, an unvalved conduit for connecting said tube and control cylinder, a control piston located in said control cylinder for alternately creating pressure and vacuum conditions therein and in said tube, means carried by said control piston and operated automatically for releasing said pressure and vacuum conditions at the end of their creation, a power cylinder and piston for operating said control piston, a pilot valve adapted to periodically place said control piston in operation on the compression stroke, means to automatically reverse the movement of the piston as soon as the compression stroke is completed, and separate means for independently varying the quickness at which the pressure and vacuum conditions are created without varying the speed of the machine as a whole.

11. A pneumatic gob feeder comprising a well adapted to contain molten glass and having a discharge opening in its bottom, a tubular member having a lower open end extending into the molten glass, a control cylinder, an unvalved conduit for connecting said tube and control cylinder, a reciprocating control piston mounted in said control cylinder for alternately creating a plus and minus pressure therein, a power cylinder, a piston located therein, a piston rod connecting both of said pistons, a valve for alternately admitting air to opposite ends of the power cylinder for reciprocating the piston, an air cylinder having a piston therein for operating said valve, a pilot valve for operating said air cylinder and valve so as to operate said power and control pistons on the plus pressure stroke, a trip valve operated by the control piston for reversing the air valve when the control piston reaches the end of the plus pressure stroke thereby automatically reversing the power and control pistons thereby causing said control piston to operate on the minus pressure stroke.

12. A pneumatic gob feeder comprising a well adapted to contain molten glass and having a submerged discharge outlet, a tube having one end extending into said well and the glass therein and in alignment with said outlet, an unvalved conduit secured to the opposite end of said tube, a control cylinder secured to the opposite end of said conduit, a control piston located in said control cylinder for alternately creating pressure and vacuum in said tube, means for operating said piston, a timing device for periodically placing said control piston in operation on the pressure stroke, means for momentarily releasing all of the created pressure at the end of the pressure stroke, a valve operated by the control piston for automatically reversing the movement of the control piston as soon as the same has reached the end of its pressure stroke, a shear located below the discharge outlet, means for operating said shear, a valve operated by the control piston at the commencement of its reverse stroke for placing said shear in operation, and means for varying the cycles of the control piston and shear without changing the cycle of the timing device.

13. A pneumatic gob feeder comprising a well adapted to contain molten glass and having a submerged discharge outlet, a tube having one end extending into said well and the glass therein and in alignment with said outlet, an unvalved conduit secured to the opposite end of said tube, a control cylinder secured to the opposite end of said conduit, a control piston located in said control cylinder for alternately creating a pressure and vacuum in said tube, means for operating said piston, a timing device for periodically placing said control piston in operation on the pressure stroke, a valve operated by the control piston for automatically reversing the movement of the control piston when the same has reached the end of its pressure stroke, a shear located below the discharge outlet, means for operating said shear, a valve operated by the control piston at the commencement of its reverse stroke for placing said shear in operation, means for varying the cycles of the control piston and shear without changing the cycle of the timing device, and without varying the volume of air introduced into or withdrawn from the tube.

14. A pneumatic gob feeder comprising a well adapted to have a predetermined head of glass maintanied therein and provided in its bottom with a discharge orifice, a tubular member having an open lower end extending into the molten glass, a control cylinder, an unvalved conduit connecting the upper end of said tubular member with said control cylinder, a control piston within said control cylinder for creating pressure and vacuum therein, valves carried by said control piston and adapted to be automatically opened at the extreme end of each piston stroke for releasing a pressure and vacuum created thereby in the tubular member to atmosphere, a power cylinder, a power piston in said cylinder, a piston rod for connecting said control and power pistons, means periodically and intermittently operated for admitting air to one end of the power cylinder for moving the piston therein in one direction, adjustable means for varying the effective length of the power cylinder, means for raising and lowering said tubular member whereby its volumetric air capacity above the glass therein is altered proportionately as the effective length of the power cylinder is varied, a valve for automatically causing the control piston to be reversed immediately upon the release of the pressure created thereby, and means carried by said control piston for operating said valve.

15. A pneumatic gob feeder comprising a well having a submerged outlet orifice and adapted to have a predetermined head of molten glass continuously maintained therein, a tubular member having an open lower end extending into said well and the glass contained therein and in alignment with said outlet orifice, a control cylinder, an unvalved conduit for connecting the upper end of said tubular member with said control cylinder, a reciprocating control piston located in said control cylinder for alternately creating pressure and vacuum conditions therein and in said conduit and tube, means for reciprocating said control piston, automatically operated valves carried by said control piston for restoring atmospheric conditions in said tube at the end of each of its strokes, a periodically operated pilot valve for starting said control piston on its pressure stroke, control means for varying the periodicity of operation of said pilot valve, a severing means located below the outlet orifice, an air cylinder for operating said shears, a trip valve operated by the control piston for automatically reversing the same when said piston has reached the end of the pressure stroke, a nonadjustable trip valve operated by said control piston for operating said severing means for severing when said control piston has reached a predetermined point of its return stroke, a nonadjustable trip valve automatically operated by said severing means after the severing has occurred for automatically returning said severing means to its starting position, and a nonadjustable trip valve automatically operated by said severing mechanism when the same has reached a predetermined point of its return stroke for starting a forming machine.

16. The pneumatic gob feeder of claim 15 in which means is provided for varying the time of operation of said trip valves simultaneously within the cycle of operation of the pilot valve.

17. A pneumatic gob feeder comprising a well adapted to contain molten glass and having a discharge opening in its bottom, a tubular member having a lower open end extending into the molten glass, a control cylinder, an unvalved conduit for connecting said tube and control cylinder, a reciprocating control piston mounted in said control cylinder for alternately creating a plus and minus pressure therein, a power cylinder, a piston located therein, a piston rod connecting both of said pistons, a valve for alternately admitting air to opposite ends of the power cylinder for reciprocating the piston, an air cylinder having a piston therein for operating said valve, a pilot valve for operating said air cylinder and valve so as to operate said power and control pistons on the plus pressure stroke, a trip valve operated by the control piston for reversing the power cylinder air valve when the control piston reaches the end of the plus pressure stroke thereby automatically reversing the power and control pistons thereby causing said control piston to operate on the minus pressure stroke, and means for regulating the frequency of operation of the pilot valve thereby automatically regulating the speed of the machine as a whole.

18. A pneumatic gob feeder comprising a well adapted to contain molten glass and having a submerged discharge outlet, a tube having one end extending into said well and the glass therein and in alignment with said outlet, an unvalved conduit secured to the opposite end of said tube, a control cylinder secured to the opposite end of said conduit, a control piston located in said control cylinder for alternately creating a pressure and vacuum in said tube, means for operating said piston, a fluid controlled timing device for periodically placing said control piston in operation on the pressure stroke, a valve operated by the control piston for automatically reversing the movement of the control piston when the same has reached the end of its pressure stroke, a shear located below the discharge outlet, means for operating said shear, a valve operated by the control piston at the commencement of its reverse stroke for placing said shear in operation, valves for varying the quickness of operation of the control piston and shear without changing the quickness of operation of the timing device, and without varying the volume of air introduced into or withdrawn from the tube.

19. A pneumatic gob feeder comprising a well adapted to contain molten glass and having a submerged discharge outlet, a tube having one end extending into said well and the glass therein and in alignment with said outlet, an unvalved conduit secured to the opposite end of said tube, a control cylinder secured to the opposite end of said conduit, a control piston located in said control cylinder for alternately creating a pressure and vacuum in said tube, means for operating said piston, a fluid controlled timing device for periodically placing said control piston in operation on the pressure stroke, a valve operated by the control piston for automatically reversing the movement of the control piston when the same has reached the end of its pressure stroke, a shear located below the discharge outlet, means for operating said shear, a valve operated by the control piston at the commencement of its reverse stroke for placing said shear in operation, valves for varying the quickness of operation of the control piston and shear without changing the quickness of operation of the timing device, and without varying the volume of air introduced into or withdrawn from the tube, and means for varying the frequency of operation of said fluid controlled timing device thereby varying the speed of the machine as a whole.

In testimony whereof I have affixed my signature.

SAMUEL G. STUCKEY.